United States Patent
Na et al.

(10) Patent No.: US 8,895,104 B2
(45) Date of Patent: Nov. 25, 2014

(54) THIN FILM COMPOSITE MEMBRANES EMBEDDED WITH MOLECULAR CAGE COMPOUNDS

(75) Inventors: Young-Hye Na, San Jose, CA (US); Ratnam Sooriyakumaran, San Jose, CA (US); Ankit Vora, San Jose, CA (US); Jacquana Diep, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/175,661

(22) Filed: Jul. 1, 2011

(65) Prior Publication Data

US 2013/0001153 A1   Jan. 3, 2013

(51) Int. Cl.
| | |
|---|---|
| *B01D 39/00* | (2006.01) |
| *B01D 39/14* | (2006.01) |
| *B01D 29/00* | (2006.01) |
| *B01D 29/46* | (2006.01) |
| *B05D 5/00* | (2006.01) |
| *C08G 77/455* | (2006.01) |
| *B01D 71/82* | (2006.01) |
| *C08L 83/10* | (2006.01) |
| *C08J 9/36* | (2006.01) |
| *B01D 71/56* | (2006.01) |
| *B01D 71/70* | (2006.01) |
| *B01D 69/12* | (2006.01) |
| *C08L 81/06* | (2006.01) |
| *C08G 77/26* | (2006.01) |
| *C08G 77/04* | (2006.01) |

(52) U.S. Cl.
CPC ............... *B01D 71/70* (2013.01); *C08G 77/26* (2013.01); *C08G 77/455* (2013.01); *B01D 71/82* (2013.01); *C08L 83/10* (2013.01); *C08J 9/36* (2013.01); *B05D 5/00* (2013.01); *C08G 77/045* (2013.01); *B01D 71/56* (2013.01); *B01D 69/125* (2013.01); *C08L 81/06* (2013.01); *B01D 2323/30* (2013.01)
USPC ................... 427/244; 210/500.27; 210/502.1; 210/490; 427/245

(58) Field of Classification Search
CPC .. B01D 69/12; B01D 2323/02; B01D 61/025; B01D 67/0079; B01D 69/125; B01D 71/56; B01D 71/70; B01D 2325/12; B01D 2325/16; B01D 69/10
USPC ............ 210/500.27, 490, 502.1, 488; 521/53; 427/244, 245
See application file for complete search history.

(56) References Cited

U.S. PATENT DOCUMENTS

| | | | |
|---|---|---|---|
| 4,056,456 | A | 11/1977 | Sano et al. |
| 4,277,344 | A | 7/1981 | Cadotte |
| 4,520,044 | A | 5/1985 | Sundet |
| 4,767,645 | A * | 8/1988 | Linder et al. .................. 427/386 |

(Continued)

FOREIGN PATENT DOCUMENTS

| | | |
|---|---|---|
| AU | 200157746 A1 | 2/2003 |
| CN | 1401417 A | 3/2003 |

(Continued)

OTHER PUBLICATIONS

Yao et al., "Antibacterial effect of surface-functionalized polypropylene hollow fiber membrane from surface-initiated atom transfer radical polymerization," Journal of Membrane Science, 319, 2008, pp. 149-157.

(Continued)

*Primary Examiner* — Ana Fortuna
(74) *Attorney, Agent, or Firm* — Shumaker & Sieffert, P.A.

(57) ABSTRACT

A polymeric membrane on a support, wherein the polymeric membrane includes a crosslinked polymer covalently bound to a molecular cage compound. An interfacial polymerization method for making the polymeric membrane is also disclosed.

15 Claims, 5 Drawing Sheets

(56) References Cited

U.S. PATENT DOCUMENTS

| | | |
|---|---|---|
| 4,769,148 A | 9/1988 | Fibiger et al. |
| 4,970,034 A | 11/1990 | Ly et al. |
| 5,041,225 A | 8/1991 | Norman |
| 5,510,394 A | 4/1996 | Hodgdon |
| 5,512,205 A | 4/1996 | Lai |
| 5,998,200 A | 12/1999 | Bonaventura et al. |
| 6,083,393 A | 7/2000 | Wu et al. |
| 6,551,536 B1 | 4/2003 | Kwak et al. |
| 6,569,932 B2 | 5/2003 | Hsiao et al. |
| 6,767,930 B1 | 7/2004 | Svejda et al. |
| 7,067,606 B2 | 6/2006 | Mather et al. |
| 7,282,148 B2 | 10/2007 | Dalton et al. |
| 7,316,919 B2 | 1/2008 | Childs et al. |
| 7,381,331 B2 | 6/2008 | Duong et al. |
| 7,381,471 B2 | 6/2008 | Augustine et al. |
| 7,572,872 B2 | 8/2009 | Flodin et al. |
| 7,604,746 B2 | 10/2009 | Childs et al. |
| 8,029,857 B2* | 10/2011 | Hoek et al. ............. 427/245 |
| 8,058,380 B1 | 11/2011 | Vij et al. |
| 8,321,013 B2* | 11/2012 | Darvish et al. ............. 607/9 |
| 2002/0113008 A1* | 8/2002 | Mickols ............. 210/500.38 |
| 2006/0249447 A1* | 11/2006 | Yeager ............. 210/506 |
| 2007/0238317 A1 | 10/2007 | Allen et al. |
| 2008/0149561 A1 | 6/2008 | Chu et al. |
| 2008/0160104 A1 | 7/2008 | Ramesh et al. |
| 2008/0214694 A1 | 9/2008 | Yokota et al. |
| 2008/0237126 A1 | 10/2008 | Hoek et al. |
| 2009/0078640 A1* | 3/2009 | Chu et al. ............. 210/321.6 |
| 2010/0004202 A1* | 1/2010 | Chisholm et al. ............. 514/63 |
| 2010/0006495 A1 | 1/2010 | Buschema et al. |
| 2010/0062156 A1* | 3/2010 | Kurth et al. ............. 427/243 |
| 2010/0176057 A1 | 7/2010 | Karnik et al. |
| 2010/0224555 A1 | 9/2010 | Hoek et al. |
| 2011/0017662 A1* | 1/2011 | Okabe et al. ............. 210/500.27 |
| 2011/0120940 A1 | 5/2011 | Allen et al. |
| 2012/0285890 A1* | 11/2012 | Koehler et al. ............. 210/651 |
| 2013/0105395 A1* | 5/2013 | Jeffrey et al. ............. 210/654 |

FOREIGN PATENT DOCUMENTS

| | | |
|---|---|---|
| EP | 1283068 A1 | 2/2003 |
| FR | 2843045 A1 | 2/2004 |
| GB | 2390042 A | 12/2003 |
| JP | 2003053163 A | 2/2003 |
| JP | 2004025102 A | 1/2004 |
| WO | 2007052260 A2 | 5/2007 |

OTHER PUBLICATIONS

Susanto et al., "High-performance thin-layer hydrogel composite membranes for ultrafiltration of natural organic matter," Water Research, 42, 2008, pp. 2827-2835.

Carroll et al., "Polyelectrolyte-grafted microfiltration membranes to control fouling by natural organic matter in drinking water," Journal of Membrane Science, 203, 2002, pp. 3-13.

Zhang et al., "Water Absorbency of Poly(sodium acrylate) Superabsorbents Crosslinked with Modified Poly(ethylene glycol)s," Journal of Applied Polymer Science, vol. 90, 1851-1856, 2003.

Ju et al., "Crosslinked poly(ethylene oxide) fouling resistant coating materials for oil/water separation," Journal of Membrane Science, 307, 2008, pp. 260-267.

Potts et al., "A Critical Review of Fouling of Reverse Osmosis Membranes," Desalination, 36, 1981, pp. 235-264.

Wu et al., "Crystallization of POSS in a PEG-Based Multiblock Polyurethane: Toward a Hybrid Hydrogel," Mater. Res. Soc. Symp. Proc. vol. 847, 2005, 6 pp.

Galia et al., "Monodisperse Polymer Beads as Packing Material for High-Performance Liquid Chromatography: Effect of Divinylbenzene Content on the Porous and Chromatographic Properties of Poly(stryrene-co-divinylbenzene) Beads Prepared in Presence of Linear Polystyrene as a Porogen," Journal of Polymer Science: Part A: Polymer Chemistry, vol. 32, 2169-2175, 1994.

Haddad et al., "Nanostructured Hybrid Organic/Inorganic Materials, Silsequioxane Modified Plastics," Polymer Preprints, vol. 40, No. 1, 2001, 2 pp.

"Hybrid Plastic™ POSS® Chemical Catalog" 2009 v. 1.01, 39 pp.

U.S. Appl. No. 12/624,605, by Robert David Allen, filed Nov. 24, 2009.

Jadav et al., "Synthesis of novel silica-polyamide nanocomposite membrane with enhanced properties," J. Membr. Sci., 328 (1-2), pp. 257-267, 2009.

Jeong et al., "Interfacial polymerization of thin film nanocomposites: A new concept for reverse osmosis membranes," J. Membr. Sci., 294 (1-2), pp. 1-7, 2007.

International Search Report and Written Opinion from corresponding PCT Application Serial No. PCT/US2012/043739 dated Sep. 24, 2012 (7 pages).

International Preliminary Report on Patentability from corresponding PCT Application Serial No. PCT/US2012/043739 dated Jul. 30, 2013 (14 pages).

Lee et al., "Telechelic Poly(ethylene glycol)-POSS Amphiphiles at the Air/Water Interface," Macromolecules, 2007, 40, pp. 682-688.

Isayeva et al., "Amphiphilic Membranes Crosslinked and Reinforced by POSS," Journal of Polymer Science: Part A: Polymer Chemistry, vol. 42, pp. 4337-4352, 2004.

\* cited by examiner

THIN FILM COMPOSITE MEMBRANES EMBEDDED WITH MOLECULAR CAGE COMPOUNDS

TECHNICAL FIELD

The present disclosure relates to polymeric films including chemically bound molecular cage compounds. The films may be used in, for example, filtration applications, or applied on another membrane to form a performance enhancing layer thereon.

BACKGROUND

Membrane technologies such as microfiltration (MF), ultrafiltration (UF), nanofilitration (NF), and reverse osmosis (RO) have been widely used for water purification because they are energy efficient, cost-effective and simple to operate. Membrane filtration based on reverse osmosis (RO) is one of the most promising ways to desalinate seawater or brackish water, and thin film composite (TFC) or thin film nanocomposite (TFNC) membranes including ultra-thin active layers on porous supports have been widely used for this application. In TFC membranes, the active layer plays an important role in controlling water and salt transport properties, while the support layer provides enough mechanical strength to endure high operating pressure. Cross-linked aromatic polyamides prepared by interfacial polymerization of m-phenylenediamine (MPD) and trimesoyl chloride (TMC) have been used as an active layer in commercial desalination membranes.

Enhanced water flux through the membrane contributes to reducing overall operating energy during the membrane filtration process. Although some aromatic polyamide TFC membranes have very high salt rejection (≥99%), new active layers have been developed with a goal of improving water flux while retaining this high salt rejection. For example, crosslinked polyamide membranes have been embedded with nanoparticles such as zelolite or silica, which are physically incorporated into the polymeric matrix.

SUMMARY

Physically incorporated nanoparticles can leach from the membrane active layer during membrane filtration processes. In the present disclosure, functionalized nanomaterials that can be chemically bound to aromatic polyamides during interfacial polymerization form a more durable nanocomposite active layer with enhanced RO performance. In general, the present invention relates to thin films having an active layer incorporating a chemically bound molecular cage compound. Suitable molecular cage compounds include reactive functionality that can be reacted with an acid halide reactant as the thin film is formed using an interfacial polymerization process.

For example, if the molecular cage compound chemically bound to the active layer has an inner cavity larger than the diameter of a water molecule, the water permeation rate through the active layer may increase, which can enhance water flux through the active layer. By controlling the amount of the molecular cage compound bound to the active layer, the density of the surface of the active layer can be substantially maintained to retain the beneficial salt rejection properties of the layer.

In one embodiment, the present invention is directed to a polymeric membrane on a support, wherein the polymeric membrane includes a crosslinked polymer, and wherein the crosslinked polymer is covalently bound to a molecular cage compound.

In another embodiment, the present invention is directed to a method, including:

a) dipping a support membrane into an aqueous solution, wherein the aqueous solution includes an amine compound and a functionalized cage compound, wherein the cage compound is selected from the group consisting of POSS, cyclodextrin, calixarene and combinations thereof;

b) removing the support membrane from the aqueous solution; and c) dipping the support membrane into an organic solution comprising an acid halide compound, wherein the organic solution is immiscible with water.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
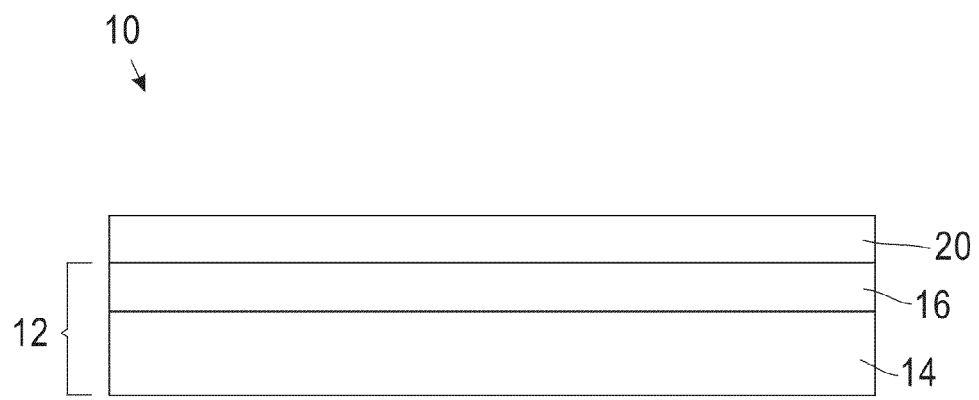
FIG. 1 is a schematic cross-sectional layer diagram of an embodiment of a TFC filtration membrane.

FIG. 1 illustrates a TFC membrane 10 including a support 12. The support 12, which provides structural integrity for the membrane construction, may include a wide variety of porous layers, and is not limited to the arrangement shown in FIG. 1.

In the embodiment shown in FIG. 1, the support 12 includes a support web 14 of a flexible, porous, organic polymeric material that can be fibrous in nature if desired. An example of a fibrous backup or support material 14 is a paper-like web of spun-bonded polymeric (e.g., polyester) fibers having diameters in the micrometer range.

A porous support membrane 16 resides on the support 14. The porous support membrane 16 may vary widely depending on the intended application of the TFC membrane 10. In one embodiment, the porous support membrane 16 is an ultrafiltration membrane that can be used to support RO/NF membranes made with an interfacial polymerization process. The porous support membrane can be flexible or rigid, and can include an organic material, inorganic material, a metal material, or a combination of the foregoing materials. Exemplary organic materials for porous support membranes include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd), polycarbonates (e.g., those sold under the trade designation NUCLEPORE by Whatman Ltd), poly(vinylidene difluoride), polypropylenes, Nylon 6,6, poly(tetrafluoroethylene)s (e.g., those sold under the trade names PORO-TEX and PARA-TEL by DeWAL Industries), and combinations of the foregoing materials. Exemplary inorganic materials for porous support membranes include nanoporous alumina ($Al_2O_3$) (e.g., those sold under the trade designation ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals for porous support membranes include for example nickel, nickel alloys, and stainless steel.

The porous support membrane 16 preferably has an average pore diameter of about 1 to about 1000 nm, about 1 to 100 nm (0.1 micrometer), about 1 to 10 nm, about 2 to about 8 nm, and even more preferably about 3 to about 6 nm. In this application the term "pores" refers to regular and irregular voids and/or channels extending from one face to an opposite face of the porous support membrane. Microfiltration (MF) support membranes have an average pore size of about 0.1 micrometers and a molecular weight cutoff of about 500,000 Daltons. Ultrafiltration (UF) support membranes have an average pore size of about 0.01 micrometers to about 0.1 micrometers and a molecular weight cutoff of about 1,000 Daltons to 500,000 Daltons. Nanofiltratoin (NF) support membranes have an average pore size of about 0.001 micrometers to about 0.01 micrometers and a molecular weight cutoff of about 100 Daltons to about 1000 Daltons. Reverse Osmosis (RO) support membranes have an average pore size of about 0.001 micrometers or less and a molecular weight cutoff of less than about 100 Daltons. The pore size of poly(sulfone) (PSF) ultrafiltration support membrane used in the examples below is about 1 to about 10 nm.

The porous support membrane 16 may have a thickness of 1 micrometer to 10 millimeters, more particularly 1 micrometer to 100 micrometers, more particularly 1 micrometer to 80 micrometers, and even more particularly 1 micrometer to 50 micrometers.

Figure 2:
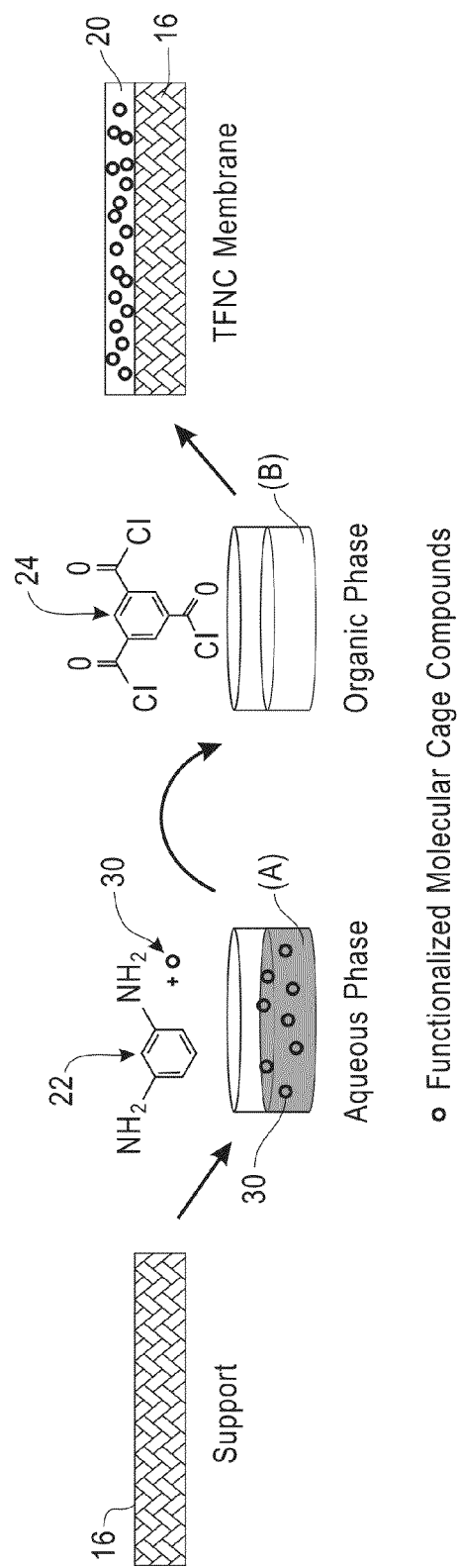
FIG. 2 is a schematic representation of an embodiment of an interfacial polymerization procedure that may be used to fabricate the polyamide TFC membranes described in this disclosure.

Referring again to FIG. 1, an active layer 20 resides on the support 12. FIG. 2 is a schematic representation of a sequence of interfacial polymerization (IP) reactions that may be used to form the active layer 20 of the TFC membrane 10. However, FIG. 2 represents only an example, and the present invention is not limited to this specific procedure or order of operations.

In the embodiment shown in FIG. 2, the active layer 20 of the TFC membrane 10 is derived from an interfacial polymerization (IP) reaction between an aqueous chemical mixture (A) and an organic chemical mixture (B) on the support layer 16 (FIG. 1). The aqueous chemical mixture (A) and the organic chemical mixture (B) are immiscible. When the mixtures (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

The aqueous chemical mixture (A) includes a monomeric polyamine reactant 22, represented by Formula 1:

$$R(NH_2)_z \qquad \text{Formula 1}$$

wherein R in Formula 1 represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments of the compounds of Formula 1, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admanthane rings, norbornane rings and combinations thereof. In some embodiments, R in Formula 1 is a benzene ring, and z is equal to 2.

Referring again to FIG. 2, the aqueous chemical mixture (A) further includes at least one functionalized molecular cage compound 30. A molecular cage compound includes cage and cage-like structures having an arrangement of atoms or molecules bonded to create a fully or a substantially bounded space, which is referred to herein as an inner cavity. Structures having a substantially bounded space include, for example, cylindrically-shaped structures having one or more open ends. The dimensions of the inner cavity may vary widely depending on the desired properties of the active layer, and may be selected to enhance the porosity of the active layer. For example, to enhance water flux through the membrane, an inner cavity with an inner diameter larger than the diameter of a water molecule (about 0.28 nm) may be used. After incorporating the molecular cage compound, the water permeation rate through the active layer is expected to be higher than the water flux of a traditional cross-linked polyamide layer lacking the molecular cage compound. By controlling the loading amount of the molecular cage compounds in the active layer, a top surface of the active layer can be made sufficiently dense to retain high salt rejection.

Suitable molecular cage compounds are shown in Table 1 below, and include, but are not limited to, cyclodextrin, calixarene, and POSS compounds. Table 1 further includes representative approximate inner diameters of the inner cavities of members of these classes of functionalized cage compounds. The functionalized molecular cage compounds listed in Table 1 are substantially water-soluble and include at their vertices functional groups R capable of reacting with an acid halide reactant 24 in the organic chemical mixture (B) to chemically bind the molecular cage compound to the crosslinked active layer 20 (FIG. 2).

TABLE 1

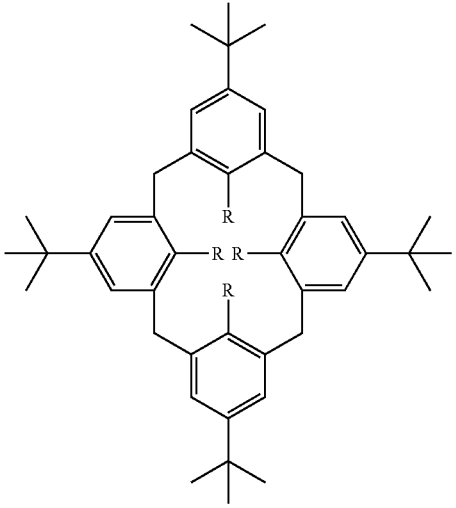

| Name | Calixarene | Cyclodextrin | POSS |
|---|---|---|---|
| Inner diameter | 4-t-butylcalix-4-arene~0.5 nm | α-CD(6) 0.45-0.57 nm<br>β-CD(7) 0.62-0.78 nm<br>γ-CD(8) 0.79-0.95 nm | 0.3-0.4 nm |

In the compounds set forth in Table 1, R is independently selected from amine-containing and alcohol-containing moieties. R is preferably independently selected from $(L)_n$-OH, $(L)_n$-NH$_2$, or $(L)_n$-NH$_2$ HX, wherein L is a linking group such as alkylene, arylene, siloxy, an ether linkage, or combination thereof, n is an integer from 0 to 10, preferably an integer from 0 to 6, and X is halogen.

For example, POSS compounds, which have a cage-like structure, can be synthesized to include a wide variety of linking groups and/or functional groups (referred to herein generally as functional groups) at their cage vertices. The linking and/or functional groups on the POSS compounds can include reactive functionality suitable for polymerization or grafting POSS monomers to polymer chains, as well as non-reactive functionality to link to a functional group and/or enhance, for example, solubility and compatibility of the POSS compounds with a particular polymer system. The linking and/or functional groups can be used to polymerize the POSS compounds with a wide variety of comonomers.

In the present application, the term POSS compound refers to resins having the structures (I), (II), or (III) below, where:

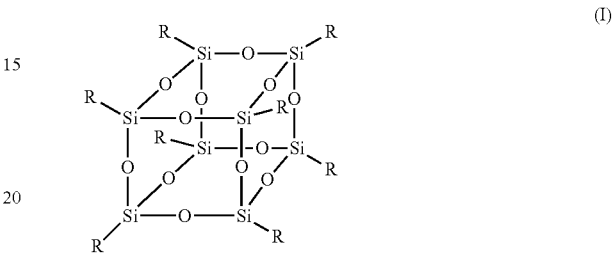

(I)

is denoted by the formula $T_8^R$, where T represents $RSiO_{3/2}$;

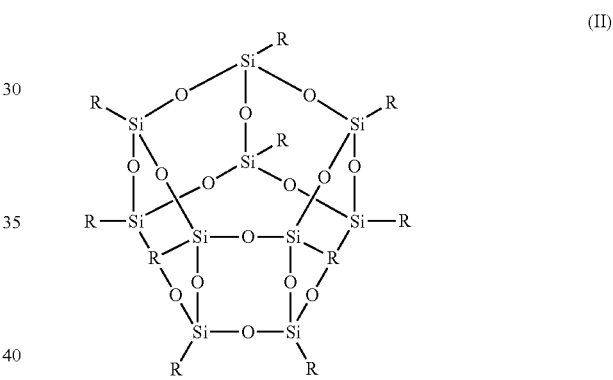

(II)

is denoted by the formula $T_{10}^R$, where T represents $RSiO_{3/2}$;

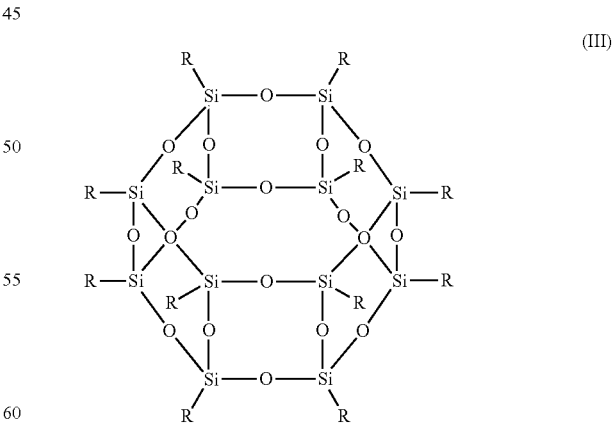

(III)

is denoted by the formula $T_{12}^R$, where T represents $RSiO_{3/2}$.

In each of the structures (I)-(III) above, R is independently selected from amine-containing and alcohol-containing moieties. R is preferably independently selected from $(L)_n$-OH, $(L)_n$-NH$_2$, or $(L)_n$-NH$_2$ HX, wherein L is a linking group such as alkylene, arylene, siloxy, an ether linkage, or combination of thereof, n is an integer from 0 to 10, preferably 0 to 6, and X is halogen.

The functionalized POSS compounds in structures (I)-(III) above may be denoted by the general formulas $T_m{}^R$ where m is equal to 8, 10 or 12. When m=8, a common name of the compound is octakis(N) silsesquioxane, where N is the name of the R group.

In some embodiments, the formulations used to make the inventive thin films may include mixtures of $T_8{}^R$ POSS compounds with different R groups, mixtures of $T_{10}{}^R$ POSS compounds with different R groups, and/or mixtures of $T_{12}{}^R$ POSS compounds with different R groups. In some embodiments, the compositions of the present invention may include mixtures of $T_8{}^R$, $T_{10}{}^R$ and $T_{12}{}^R$ POSS compounds.

The functional groups on the molecular cage compounds of Table 1 and the functional groups R on the POSS compounds described above may be independently selected from any functional group that can be reacted with an acid halide in the organic chemical mixture (B) of FIG. 2. Suitable examples include, but are not limited to, amine-containing moieties and alcohol-containing moieties. For example, amine-containing moieties such as $(CH_2)_3NH_2$, have been found to be particularly suitable for reaction with acid halides commonly utilized in interfacial polymerization processes to make filtration membranes.

Figure 5:
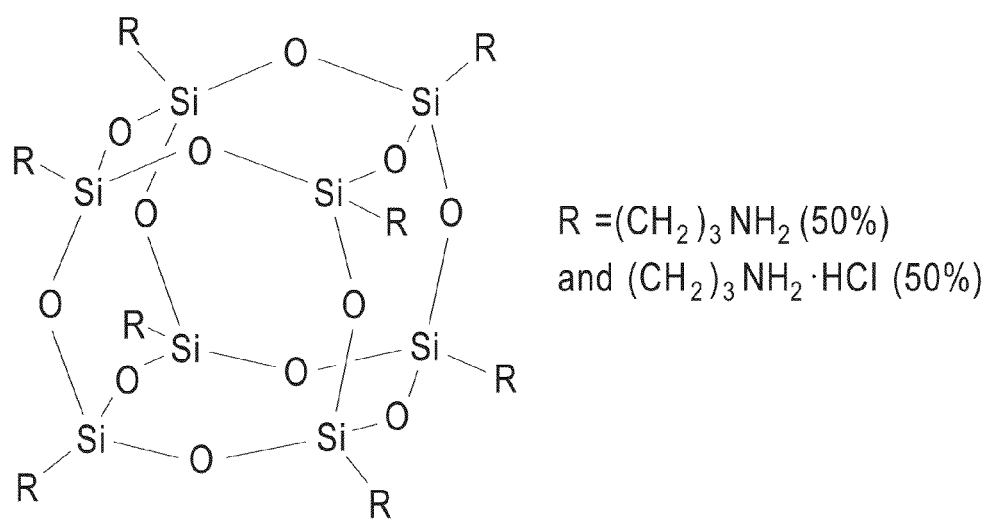
FIG. 5 is a schematic representation of a functionalized POSS compound utilized in the working examples of the present application.

Particularly preferred POSS compounds include the compounds of structural formula (III) above, with functional groups including amine-containing moieties. A suitable example is shown in FIG. 5, wherein the functional groups are amine-containing moieties such as, for example, $(CH_2)_3NH_2$, and $(CH_2)_3NH_2HCl$. Suitable functionalized POSS compounds are available from Hybrid Plastics Co., Hattiesburg, Miss.

The amount of the cage compound in the solution (A) may vary widely depending on the desired properties of the active layer, but is typically about 0.01% to 0.5% w/v (weight of the functionalized cage compound to the volume of the aqueous solution (A), measured in units of g/ml), preferably about 0.01% to about 0.3%, and more preferably about 0.01% to about 0.05%.

A base can be optionally added to aqueous solution (A) to improve the solubility of the monomeric polyamine reactants, and to scavenge an acidic reaction by-project generated during interfacial polymerization. The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, $Ca(OH)_2$, $Na_2CO_3$, $K_2CO_3$, $CaCO_3$, $NaHCO_3$, $KHCO_3$, triethyl amine, pyridine, tetramethylammonium hydroxide and combinations thereof.

The organic chemical mixture (B) in the interfacial polymerization process of FIG. 2 includes a monomeric polyfunctional acid halide reactant, represented by Formula 2:

$$R^1-(COX)_p \qquad \text{Formula 2}$$

wherein $R^1$ in Formula 2 represents an organic group selected from aliphatic alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, $R^1$ in the polyfunctional acid halide reactant of Formula 2 represents an organic group with 1 to 30 carbon atoms, or 1 to 20 carbon atoms, or 1 to 15 carbon atoms. In some embodiments, in the polyfunctional acid halide reactant of Formula 2, $R^1$ can include an organic group selected from benzene rings, naphthalene rings, cyclohexane rings, admanthane rings, norbornane rings and combinations thereof.

In some embodiments, $R^1$ in the polyfunctional acid halide reactant of Formula 2 represents an organic group represented by Formula 3:

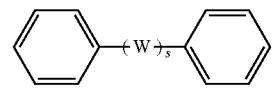

Formula 3 wherein W represents an organic group selected from $CH_2$, O, S, C=O, $SO_2$, $C(CH_3)_2$, $C(CF_3)_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acid halide reactant in solution (B) includes at least one of a divalent organic compound represented by Formula 4 or a trivalent organic compound represented by Formula 5:

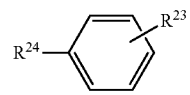

Formula 4

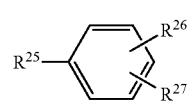

Formula 5 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acid halide reactant in solution (B) includes at least one of a compound selected from a trivalent organic compound represented by Formula 6 or a divalent organic compound represented by Formula 7:

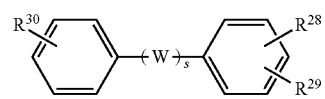

Formula 6

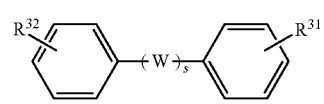

Formula 7 wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from $CH_2$, O, S, C=O, $SO_2$, $C(CH_3)_2$, $C(CF_3)_2$ and combinations thereof, and wherein s represents an integer of 0 or 1.

In other embodiments, the monomeric polyfunctional acid halide reactant in solution (B) includes a compound selected from any of the compounds in Formulas 37 through 61, and combinations thereof:

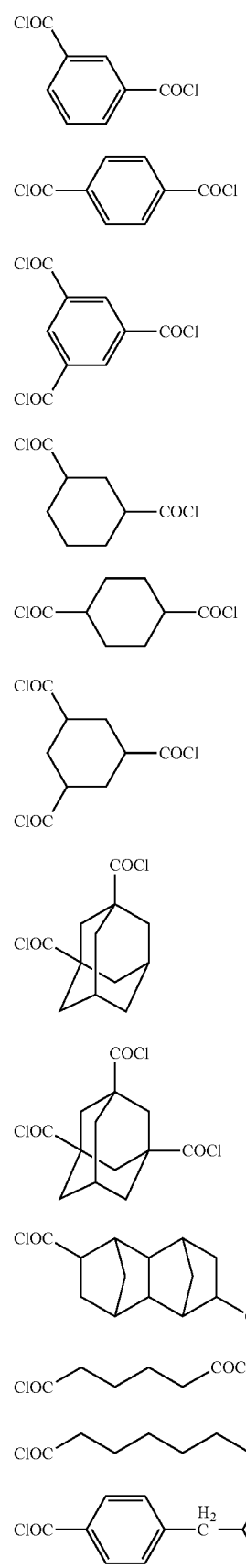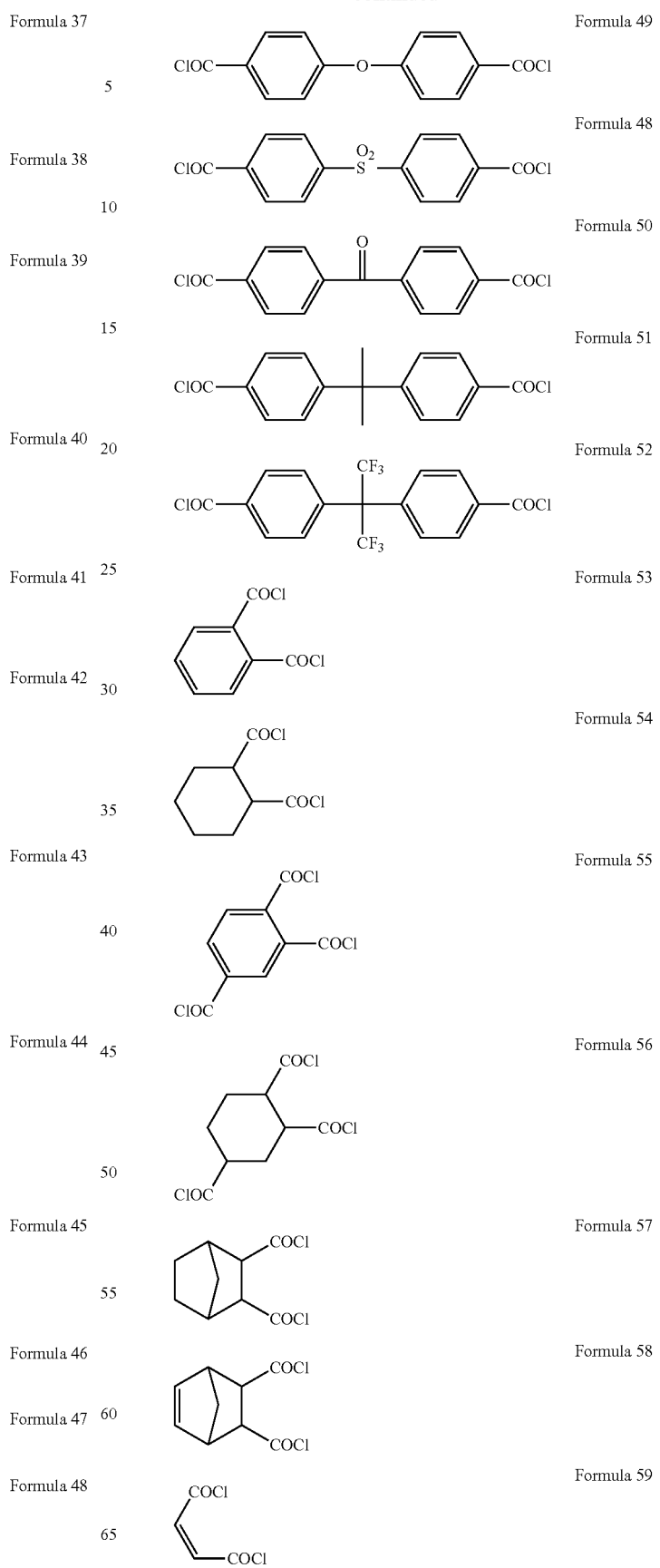

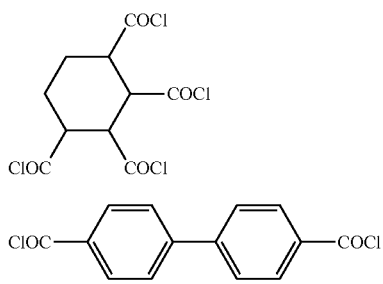

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to solution (A) and/or (B) to enhance reactivity or to improve membrane performance.

The concentration of the monomeric polyamine reactants in the aqueous solution (A) or the acid halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric amine reactants and acid halide reactants are selected to provide a polymerized polymeric reaction product that is referred to herein generally as a crosslinked polyamide. For example, diamine monomers will always make a crosslinked polyamide by reacting with an acid chloride such as trimesoyl chloride (TMC). After the interfacially polymerized, crosslinked aromatic polyamide has been formed, its crosslink density can optionally be further increased by post-polymerization reactions with crosslinking or molecular weight-increasing agents such as methane sulfonyl halides, epihalohydrins, trimethylaminesulfur trioxide complex, formaldehyde, glyoxal, and the like.

In another aspect, the present invention is a polymerized thin film reaction product including a crosslinked polymer having chemically bound thereto a molecular cage compound. In one preferred embodiment, the thin film reaction product includes a crosslinked polyamide having covalently bound thereto a molecular cage compound. The molecular cage compound is chemically bound to and forms a disperse phase embedded in the crosslinked polymer matrix. Preferably, the molecular cage compound covalently bound to the crosslinked polymer is derived from a functionalized cage compound such as a cyclodextrin, calixarene, or POSS. The functionalized cage compounds include functional groups capable of reacting with an acid halide during the interfacial reaction between an amine reactant and an acid halide reactant that forms the crosslinked polyamide matrix, such that the cage compound becomes covalently bound to and embedded in the matrix. Molecular cage compounds derived from functionalized POSS compounds are particularly preferred.

To control the thickness of the thin film reaction product, diluents that are miscible with all the components of polymerizable mixtures (A) and (B) may optionally be used. Preferred diluents include, but are not limited to: ethanol, mixtures of ethanol and water, or isopropanol.

In another embodiment, the present invention is a method for making a TFC composite membrane including an active layer on a support. Referring again to the example process shown in FIG. 2, one embodiment for making the multi-layered active layer will be discussed in more detail, which is not intended to be limiting. In this embodiment, a pre-treated support membrane 16 is placed in the aqueous solution (A) for several minutes, typically about 1 minute to about 5 minutes. Although the method of FIG. 2 includes placing the support membrane 16 in the aqueous solution (A), alternatively the method may be initiated by placing the support membrane 16 in the aqueous solution (B).

Excess solution (A) is drained from the dip-coated surface of the support membrane 16 (or excess solution is removed by rolling with rubber roller) and the coated support membrane 16 is optionally dried for about 1 minute to about 10 minutes in air at room temperature.

The diamine saturated support membrane 16 is then immersed in solution (B), and after about 1 min of reaction, the crosslinked active membrane layer 20 is formed on the support 16.

The TFC membrane 10 (FIG. 1) may then optionally be dried. The drying conditions can vary widely, but in some embodiments the membrane 10 is dried about 1 minute to about 5 minutes in air at room temperature, or optionally in an oven maintained at a temperature of about 30° C. to about 70° C. for about 1 minute to about 5 minutes.

The TFC membrane 10 may optionally be rinsed with, for example, 0.2% (w/w) sodium carbonate solution for approximately 5 min and stored in water prior to membrane testing.

The active layer 20 of the TFC membrane 10 preferably has a thickness of less than about 1 micron, and in some embodiments may have a thickness of less than about 500 nanometers.

Chemical or physical treatments (plasma or UV-ozone) can be optionally used to increase the hydrophilicity of a surface of the support membrane 16, prior to introducing the support membrane 16 into the solution (A). While not wishing to be bound by any theory, presently available evidence indicates that plasma and/or UV-ozone treatment of a polysulfone support generates a more hydrophilic surface (complete wetting by water), so it can enhance the density of the coverage of the polyamide monomer on the support layer.

Additional structural integrity can optionally be provided for the TFC membrane by laminating the support membrane 16 to a second support film or layer 14. The second support film or layer 14 is preferably a flexible, porous, organic polymeric material that can be fibrous in nature if desired. An example of a fibrous backup or support material is a paper-like web of spun-bonded polymeric (e.g., polyethylene) fibers having diameters in the micrometer range.

Flat sheet-type (for example, spiral wound-type) water purification or permselective modules utilizing the membranes described herein are useful for applications such as, for example, desalination of seawater, brackish water desalting, whey concentration, electroplating chemical recovery, softening of hard water for municipal or home use, boiler feed water treatment, and other water treatments which involve removal of a solute or contaminant.

The invention will now be further described with reference to the following non-limiting examples.

EXAMPLES m-phenylene diamine (MPD flakes, >99%) and trimesoyl chloride (TMC, 98%) were purchased from Sigma-Aldrich, and the TMC was distilled before use. Sodium chloride (NaCl) and sodium carbonate ($Na_2CO_3$) were purchased from J. T. Baker. Hexane was purchased from OmniSolv. Deionized water was used for all experiments.

Amine-functionalized POSS (A-POSS Structure (III) above, R=$(CH_2)_3NH_2 \cdot HCl$) was obtained from Hybrid Plastics Inc., Hattiesburg, Miss., and four of the R groups were neutralized with sodium hydroxide to give the desired compound referred to herein as A-POSS (FIG. 5, R=$(CH_2)_3NH_2 \cdot HCl$ (50%) and R=$(CH_2)_3NH_2$ (50%)).

Polysulfone (PSF) ultrafiltration (UF) membranes were purchased from Sepro Membranes, Inc.

Example 1

Fabrication of Reference Polyamide Membrane

A pre-treated PSF UF membrane was placed in an aqueous solution of 2% (w/v) MPD for 2 minutes, and the membrane was rolled with a rubber roller to remove excess solution. The MPD saturated PSF membrane was then immersed in a solution of 0.1% (w/v) TMC in hexane. After 1 min of reaction, the TMC solution was poured off and the resulting membrane was rinsed with an aqueous solution of 0.2% (w/v) sodium carbonate and stored in pure water.

Example 2

Fabrication of Nanocomposite Polyamide Membranes Including Amine-Functionalized POSS (A-POSS)

A pre-treated PSF UF membrane was placed in an aqueous solution of 2% (w/v) MPD including a small amount of A-POSS for 2 minutes, and the membrane was rolled with a rubber roller to remove excess solution. The PSF membrane was then immersed in a solution of 0.1% (w/v) TMC in hexane. After 1 minute of reaction, the TMC solution was poured off and the resulting membrane was rinsed with an aqueous solution of 0.2% (w/v) sodium carbonate and stored in pure water.

The loading amount of A-POSS was varied from 0.01% (w/v) to 0.5% (w/v).

Table 2 shows the Si concentration of POSS-containing polyamide membranes analyzed by X-ray photoelectron spectroscopy. By increasing A-POSS loading in the aqueous solution from 0.01% to 0.10%, the concentration of total silicon (Si) and the atomic ratio of silicon to the carbon (Si/C) were actually increased in the resulting crosslinked polyamide films, indicating that A-POSS molecules were effectively chemically incorporated into the aromatic polyamide matrix.

TABLE 2

| A-POSS Loading | Si | Si/C |
| --- | --- | --- |
| A-POSS 0.00 | 0.013 | 0.0002 |
| A-POSS 0.01 | 0.033 | 0.0005 |
| A-POSS 0.05 | 0.057 | 0.0008 |
| A-POSS 0.10 | 0.077 | 0.0011 |

Example 3

Evaluation of Nanocomposite Polyamide Membranes Including POSS

Membrane performance was evaluated using a crossflow filtration system. The pure water flux was measured at room temperature after the membrane was compressed for 3.5 hours at 200 psi. The salt rejection was then measured with a 2000 ppm aqueous solution of NaCl at the same pressure. The water flux and salt rejection values obtained with the TFC polyamide membranes were summarized in FIG. 3 and FIG. 4.

Figure 3:
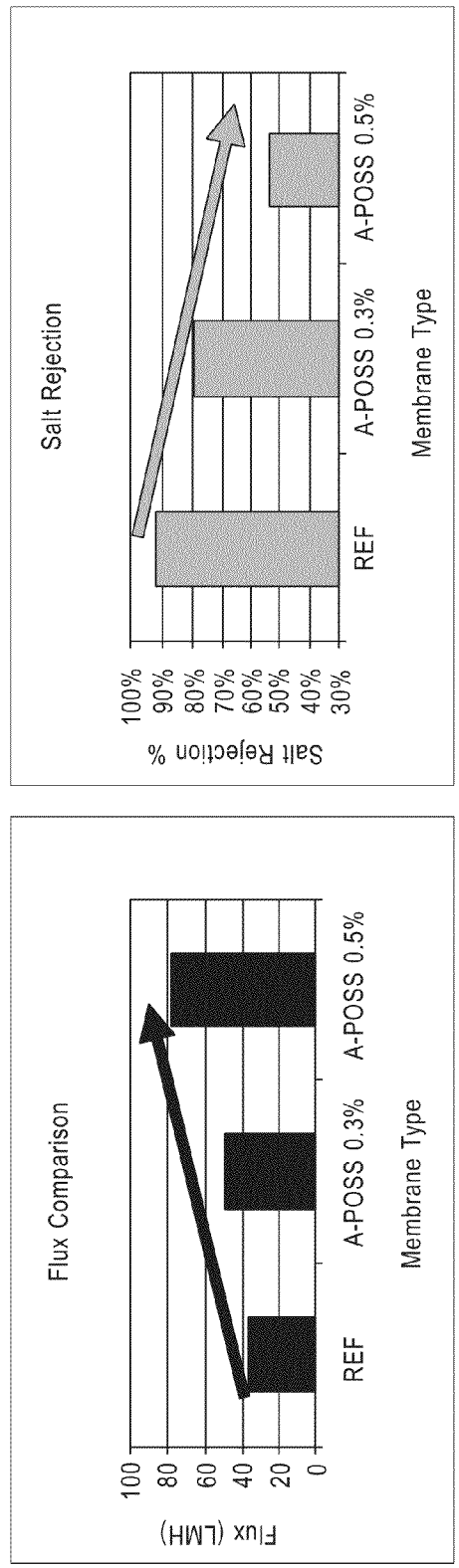
FIG. 3 is a plot of water flux (left) and salt rejection (right) data of a reference polyamide (REF) and POSS-containing polyamide membranes. POSS 0.3 and POSS 0.5 indicate 0.3% (w/v) and 0.5% (w/v) A-POSS loading into an aqueous m-phenylene diamine solution, respectively.

As shown in FIG. 3, POSS-containing polyamide RO membranes were evaluated under lab-scale crossflow filtration conditions tested with a 2000 ppm NaCl feed solution. FIG. 3 shows the water flux (left) and the salt rejection (right) values obtained with the polyamide membranes including 0.3% (w/v) and 0.5% (w/v) of A-POSS. A crosslinked aromatic polyamide membrane without A-POSS loading, described above in Example 1 as the reference polyamide membrane, was also evaluated for data comparison.

The water flux was significantly enhanced by incorporating POSS into the polyamide active layer; however, the salt rejection decreased simultaneously. This result indicates that 0.3% (w/v) and 0.5% (w/v) A-POSS loading generates too much free volume in the crosslinked polyamide active layer, which results in higher salt passage than observed in the reference polyamide membranes of Example 1.

Figure 4:
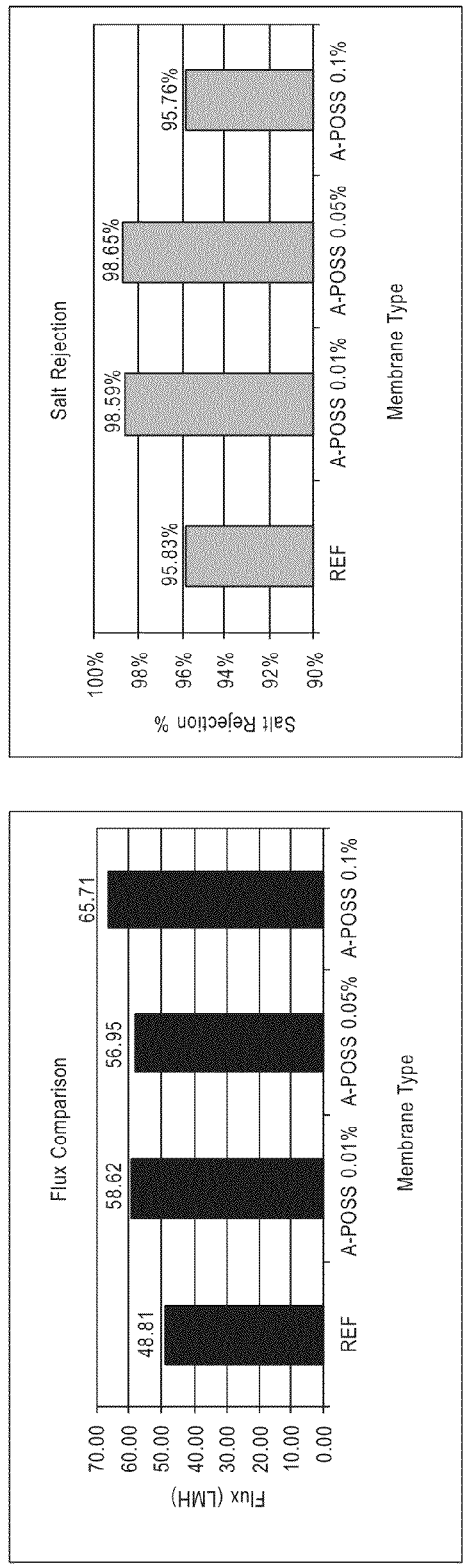
FIG. 4 is a plot of water flux (left) and salt rejection (right) data of a reference polyamide and nanocomposite polyamide membranes including 0.01% (w/v) and 0.05% (w/v) of A-POSS.

To retain high salt rejection while improving water flux, the amount of A-POSS loading in the active layer was reduced. FIG. 4 shows the water flux (left) and the salt rejection (right) values observed with the POSS-containing polyamide membranes made by 0.01% (w/v), 0.05% (w/v), and 0.1% (w/v) A-POSS loading. At low A-POSS loading, the POSS-containing polyamide membrane showed higher water flux than the reference polyamide membrane of Example 1, while retaining similar or slightly higher salt rejection as well.

As shown in FIG. 4, based on the flux and the salt rejection data of POSS-containing polyamide membranes, the optimum amount of A-POSS loading to get the best combination of water flux and salt rejection in this example is about 0.05% (w/v).

Various embodiments of the invention have been described. These and other embodiments are within the scope of the following claims.

The invention claimed is:

1. A method, comprising:
   a) dipping a support membrane into an aqueous solution, wherein the aqueous solution comprises an amine compound and a functionalized cage compound selected from the group consisting of POSS, cyclodextrin, calixarene and combinations thereof, wherein the functionalized cage compound has at least one primary amine group having the structure $(L)_n$-$NH_2$, and at least one ammonium salt having the structure $(L)_n$-$NH_2$ HX, and wherein L is a linking group selected from the group consisting of alkylene, arylene, siloxy, an ether linkage, and combinations thereof, n is integer from 0 to 10, and X is halogen;
   b) removing the support membrane from the aqueous solution; and
   c) dipping the support membrane into an organic solution comprising an acid halide compound, wherein the organic solution is immiscible in water.

2. The method of claim 1, wherein the aqueous solution comprises 0.01% to 0.5% by weight of the cage compound per unit volume of the aqueous solution.

3. The method of claim 1, wherein the aqueous solution comprises 0.01% to 0.1% by weight of the cage compound per unit volume of the aqueous solution.

4. The method of claim 1, wherein the aqueous solution comprises 0.01% to 0.05% by weight of the cage compound per unit volume of the aqueous solution.

5. The method of claim 1, wherein the cage compound comprises a POSS compound with the following structure, and wherein the R groups comprise both primary amine groups having the structure $(L)_n$-$NH_2$, and ammonium salts having the structure $(L)_n$-$NH_2$ HX, and wherein about 50% of the R groups are primary amine groups and about 50% of the R groups are ammonium salts:

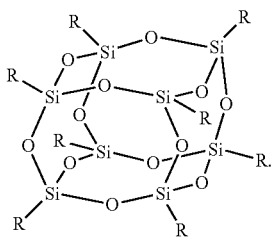

6. The method of claim 5, wherein the primary amine group is $(CH_2)_3NH_2$.

7. The method of claim 6, wherein the aqueous solution comprises 0.01% to 0.05% by weight of the POSS derivative per unit volume of the aqueous solution.

8. The method of claim 1, further comprising rinsing the membrane with an aqueous basic solution following step (c).

9. The method of claim 1, further comprising removing water from the support membrane following step (b).

10. The method of claim 1, wherein the amine compound is m-phenylene diamine and the acid halide compound is trimesoyl chloride.

11. The method of claim 1, wherein the primary amine group is $(CH_2)_3NH_2$ and the ammonium salt is $(CH_2)_3NH_2.HCl$.

12. A method, comprising:
a) applying an aqueous solution to a support membrane, wherein the aqueous solution comprises an amine compound and a functionalized cage compound selected from the group consisting of POSS, cyclodextrin, calixarene and combinations thereof, wherein the functionalized cage compound has at least one primary amine group having the structure $(L)_n$-$NH_2$, and at least one ammonium salt having the structure $(L)_n$-$NH_2$ HX, and wherein L is a linking group selected from the group consisting of alkylene, arylene, siloxy, an ether linkage, and combinations thereof, n is integer from 0 to 10, and X is halogen;
b) removing the support membrane from the aqueous solution; and
c) dipping the support membrane into an organic solution comprising an acid halide compound, wherein the organic solution is immiscible in water.

13. The method of claim 12, wherein the functionalized cage compound has about 50% of the primary amine group and about 50% of the ammonium salt.

14. The method of claim 13, wherein the primary amine group is $(CH_2)_3NH_2$ and the ammonium salt is $(CH_2)_3NH_2.HCl$.

15. The method of claim 12, wherein the primary amine group is $(CH_2)_3NH_2$ and the ammonium salt is $(CH_2)_3NH_2.HCl$.

* * * * *